US011257231B2

(12) United States Patent
Guizilini et al.

(10) Patent No.: US 11,257,231 B2
(45) Date of Patent: Feb. 22, 2022

(54) CAMERA AGNOSTIC DEPTH NETWORK

(71) Applicant: TOYOTA RESEARCH INSTITUTE, INC., Los Altos, CA (US)

(72) Inventors: Vitor Guizilini, Santa Clara, CA (US); Sudeep Pillai, Santa Clara, CA (US); Adrien David Gaidon, Mountain View, CA (US); Rares A. Ambrus, San Francisco, CA (US); Igor Vasiljevic, Chicago, IL (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 84 days.

(21) Appl. No.: 16/904,444

(22) Filed: Jun. 17, 2020

(65) Prior Publication Data
US 2021/0398301 A1 Dec. 23, 2021

(51) Int. Cl.
*G06K 9/00* (2006.01)
*G06T 7/50* (2017.01)
*G06T 7/70* (2017.01)

(52) U.S. Cl.
CPC .............. *G06T 7/50* (2017.01); *G06T 7/70* (2017.01); *G06T 2207/10016* (2013.01);
(Continued)

(58) Field of Classification Search
CPC ... G06T 7/50; G06T 7/70; G06T 2207/10016; G06T 2207/10028; G06T 2207/20081;
(Continued)

(56) References Cited

U.S. PATENT DOCUMENTS

| 8,179,448 B2 | 5/2012 | Chen et al. |
| 8,260,007 B1 * | 9/2012 | Furukawa ............... G06T 7/596 |
| | | 382/113 |

(Continued)

FOREIGN PATENT DOCUMENTS

MY 164003 A 11/2017

OTHER PUBLICATIONS

Shang et al, (Unsupervised Learning of Depth and Pose Estimation based on Continuous Frame Window, 2018 International Joint Conference on Neural Networks (IJCNN), IEEE, pp. 1-8) (Year: 2018).*

(Continued)

*Primary Examiner* — Amara Abdi
(74) *Attorney, Agent, or Firm* — Seyfarth Shaw LLP

(57) ABSTRACT

A method for monocular depth/pose estimation in a camera agnostic network is described. The method includes training a monocular depth model and a monocular pose model to learn monocular depth estimation and monocular pose estimation based on a target image and context images from monocular video captured by the camera agnostic network. The method also includes lifting 3D points from image pixels of the target image according to the context images. The method further includes projecting the lifted 3D points onto an image plane according to a predicted ray vector based on the monocular depth model, the monocular pose model, and a camera center of the camera agnostic network. The method also includes predicting a warped target image from a predicted depth map of the monocular depth model, a ray surface of the predicted ray vector, and a projection of the lifted 3D points according to the camera agnostic network.

20 Claims, 7 Drawing Sheets

(52) U.S. Cl.
CPC ............... *G06T 2207/10028* (2013.01); *G06T 2207/20081* (2013.01); *G06T 2207/20084* (2013.01); *G06T 2207/30244* (2013.01); *G06T 2207/30248* (2013.01)

(58) Field of Classification Search
CPC . G06T 2207/20084; G06T 2207/30244; G06T 2207/30248
See application file for complete search history.

(56) References Cited

U.S. PATENT DOCUMENTS

| | | | |
|---|---|---|---|
| 9,025,863 | B2 | 5/2015 | Reif |
| 9,986,151 | B1 | 5/2018 | Poon et al. |
| 2019/0156507 | A1* | 5/2019 | Zeng .......................... G06T 7/70 |
| 2019/0278983 | A1 | 9/2019 | Iqbal et al. |
| 2019/0356905 | A1* | 11/2019 | Godard ................... G06T 7/593 |
| 2021/0049371 | A1* | 2/2021 | Gu ........................... G06N 3/084 |

OTHER PUBLICATIONS

Xu et al, (Unsupervised Ego-Motion and Dense Depth Estimation with Monocular Video, 2018 18th IEEE International Conference on Communication Technology, pp. 1306-1310 (Year: 2018).*

Yunxiao et al., ("Self-Supervised Learning of Depth and Ego-motion with Differentiable Bundle Adjustment", https://arxiv.org/abs/1909.13163, Sep. 28, 2019), (Year: 2019).*

Wang et al, ("MVDepthNet: Real-time Multiview Depth Estimation Neural Network", IEEE 2018, pp. 248-257), (Year: 2018).*

Shi, et al., "Self-Supervised Learning of Depth and Ego-motion with Differentiable Bundle Adjustment", https://arxiv.org/abs/1909.13163, Sep. 28, 2019.

Wang, et al., "MVDepthNet: Real-time Multiview Depth Estimation Neural Network," https://arxiv.org/abs/1807.08563, Jul. 23, 2018.

Wang, et al., "Self-Supervised Learning of Depth and Camera Motion from 360 Videos," https://arxiv.org/abs/1811.05304, Nov. 13, 2018.

Zhou, et al., "Unsupervised Learning of Monocular Depth Estimation with Bundle Adjustment, Super-Resolution and Clip Loss," https://arxiv.org/abs/1812.03368, Dec. 8, 2018.

* cited by examiner

CAMERA AGNOSTIC DEPTH NETWORK

BACKGROUND

Field

Certain aspects of the present disclosure generally relate to machine learning and, more particularly, a camera agnostic depth network.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in a 2D image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles, however, are limited to analyzing these 2D sensor images, which omit depth information of our 3D real world.

Depth estimation from 2D images captured by a single camera (e.g., monocular) of an autonomous agent may be referred to as monocular depth estimation. Current monocular depth estimation methods, however, rely on the joint learning of depth and pose networks, using a proxy photometric loss that enables the use of geometric cues as the single source of supervision. Unfortunately, these depth and pose estimations are usually only useful for the type of camera that provided the source data for these estimations.

SUMMARY

A method for monocular depth/pose estimation in a camera agnostic network is described. The method includes training a monocular depth model and a monocular pose model to learn monocular depth estimation and monocular pose estimation based on a target image and context images from monocular video captured by the camera agnostic network. The method also includes lifting 3D points from image pixels of the target image according to the context images. The method further includes projecting the lifted 3D points onto an image plane according to a predicted ray vector based on the monocular depth model, the monocular pose model, and a camera center of the camera agnostic network. The method also includes predicting a warped target image from a predicted depth map of the monocular depth model, a ray surface of the predicted ray vector, and a projection of the lifted 3D points according to the camera agnostic network.

A non-transitory computer-readable medium having program code recorded thereon for monocular depth/pose estimation in a camera agnostic network is described. The program code is executed by a processor. The non-transitory computer-readable medium includes program code to train a monocular depth model and a monocular pose model to learn monocular depth estimation and monocular pose estimation based on a target image and one or more context images from monocular video captured by the camera agnostic network. The non-transitory computer-readable medium also includes program code to lift 3D points from image pixels of the target image according to the one or more context images. The non-transitory computer-readable medium further includes program code to project the lifted 3D points onto an image plane according to a predicted ray vector based on the monocular depth model, the monocular pose model, and a camera center according to the camera agnostic network. The non-transitory computer-readable medium also includes program code to predict a warped target image from a predicted depth map of the monocular depth model, a ray surface of the predicted ray vector, and a projection of the lifted 3D points according to the camera agnostic network.

A system for monocular depth/pose estimation in a camera agnostic network is described. The system includes a depth network to train a monocular depth model and a monocular pose model to learn monocular depth estimation and monocular pose estimation based on a target image and one or more context images from monocular video captured by the camera agnostic network. The system also includes pose network to lift 3D points from image pixels of the target image according to the one or more context images and to project the lifted 3D points onto an image plane according to a predicted ray vector based on the monocular depth model, the monocular pose model, and a camera center according to the camera agnostic network. The system further includes a view synthesis block to predict a warped target image from a predicted depth map of the monocular depth model, a ray surface of the predicted ray vector, and a projection of the lifted 3D points according to the camera agnostic network.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed

DETAILED DESCRIPTION

Figure 1:
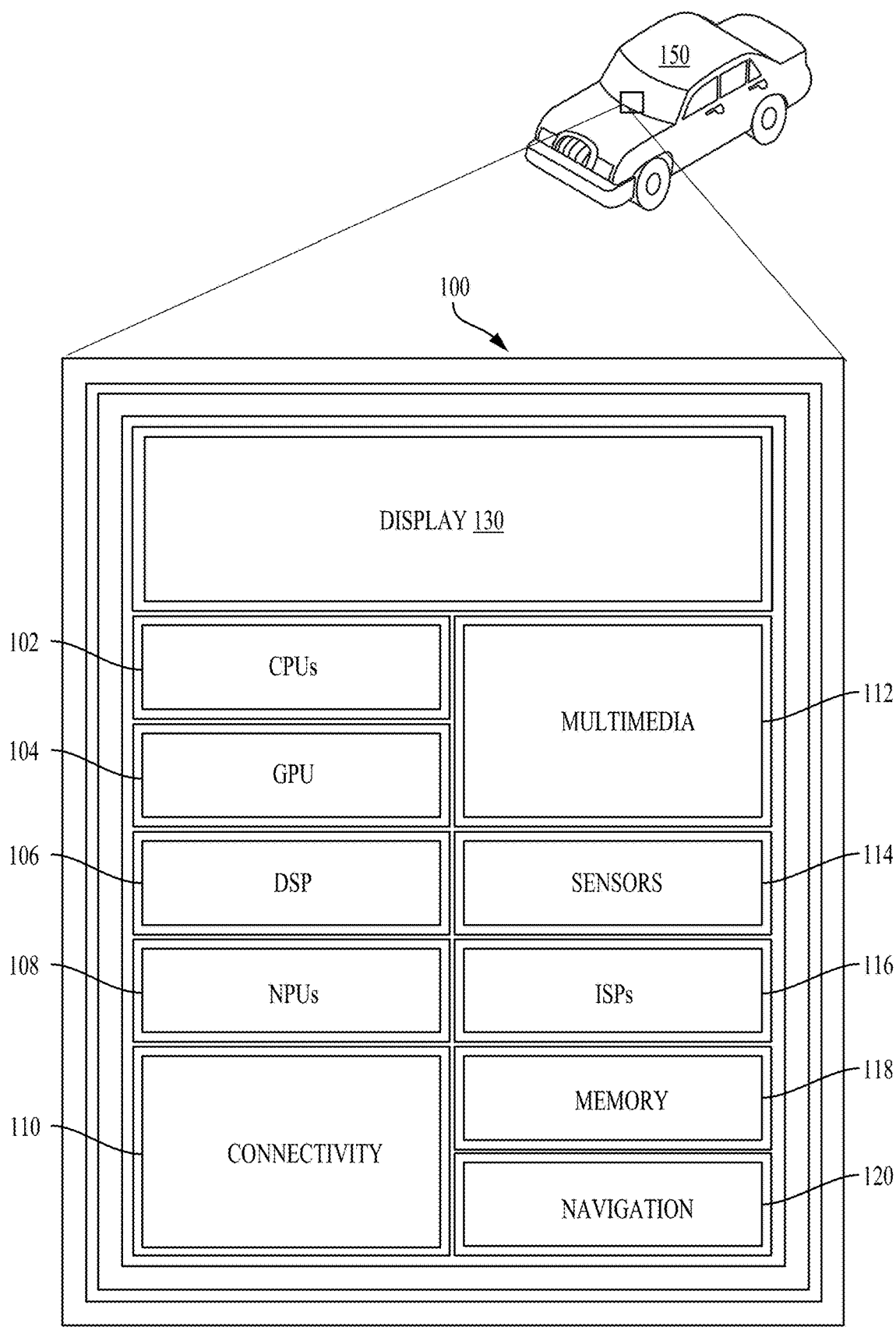
FIG. 1 illustrates an example implementation of designing a system using a system-on-a-chip (SOC) for a camera agnostic depth network, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Monocular depth and pose estimation are important perception tasks in the area of autonomous agents, such as driverless cars and robots, which are quickly evolving and have become a reality in this decade. Depth estimation from 2D images captured by a single camera (e.g., monocular) of an autonomous agent may be referred to as monocular depth estimation. Current monocular depth estimation methods, however, rely on the joint learning of depth and pose networks, using a proxy photometric loss that enables the use of geometric cues as the single source of supervision. Unfortunately, these depth and pose estimations are usually only useful for the type of camera that provided the source data for these estimations.

In particular, existing monocular depth estimation methods rely on joint learning of depth and pose networks. The joint learning of depth and pose networks relies on a proxy photometric loss that enables the use of geometric cues as a single source of supervision. Nevertheless, the photometric loss uses camera information (e.g., intrinsic information and/or extrinsic information) to synthesize a source image as a warped version of the target image. Unfortunately, depth and pose networks may only use the images themselves as input rather than photometric loss based on intrinsic/extrinsic camera information.

Aspects of the present disclosure are directed to developing standard depth and pose estimations that can be utilized across a vast array of different cameras, which may be referred to as camera agnostic depth networks. The present disclosure provides an improvement over current technology by allowing training of monocular depth and pose models in much larger datasets. The larger datasets may leverage information from any camera in a similar way by projecting this information into a camera agnostic configuration. One aspect of the present disclosure modifies standard depth and pose estimations to incorporate camera information.

Aspects of the present disclosure provide a modification to standard depth and pose estimations by incorporating camera information. Incorporating camera information into standard depth and pose estimations leads to estimates that are much more robust. The modified depth and pose estimations use a network of different cameras, both at training and testing time. This camera network enables training of monocular depth and pose models using much larger datasets. According to aspects of the present disclosure, the larger datasets leverage information from any camera in a similar way by projecting this information into a camera agnostic configuration. The camera information includes intrinsic and extrinsic camera information. For example, extrinsic parameters may define the location and orientation of the camera with respect to a world frame. Intrinsic parameters may allow a mapping between camera coordinates and pixel coordinates in an image frame.

FIG. 1 illustrates an example implementation of the aforementioned system and method for a camera agnostic depth network, using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for a camera agnostic depth network, in an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
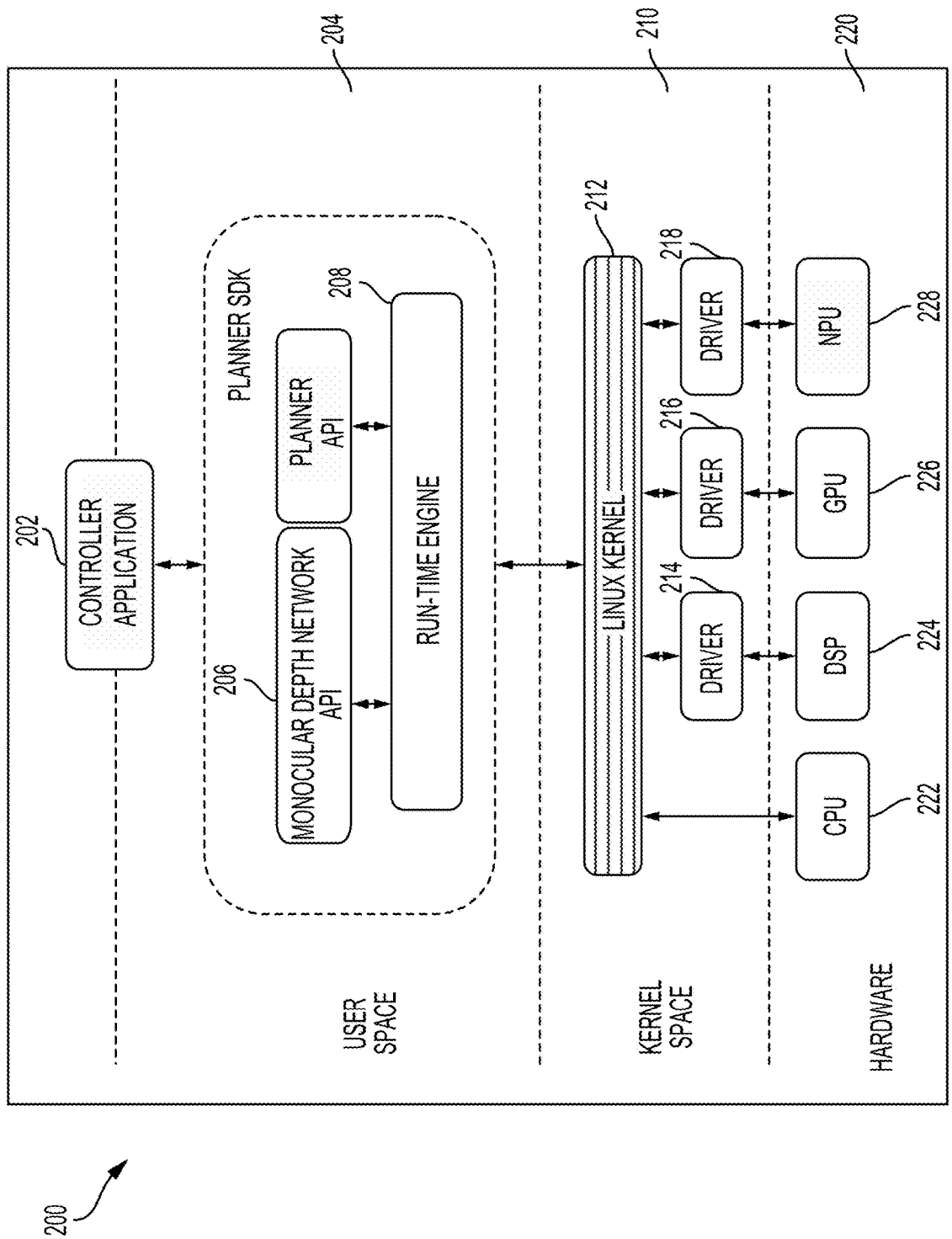
FIG. 2 is a block diagram illustrating a software architecture that may modularize functions for a camera agnostic depth network, according to aspects of the present disclosure.

FIG. 2 is a block diagram illustrating a software architecture 200 that may modularize functions for planning and control of an ego vehicle for a camera agnostic depth network, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202.

The controller application 202 may be configured to call functions defined in a user space 204 that may, for example, provide for depth and pose estimation from a camera agnostic network of an ego vehicle. The controller application 202 may make a request to compile program code associated with a library defined in a monocular depth network application programming interface (API) 206 for monocular depth-aware learning from a camera agnostic depth network for an autonomous agent.

A run-time engine 208, which may be compiled code of a runtime framework, may be further accessible to the controller application 202. The controller application 202 may cause the run-time engine 208, for example, to perform monocular (single-camera) 3D detection. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
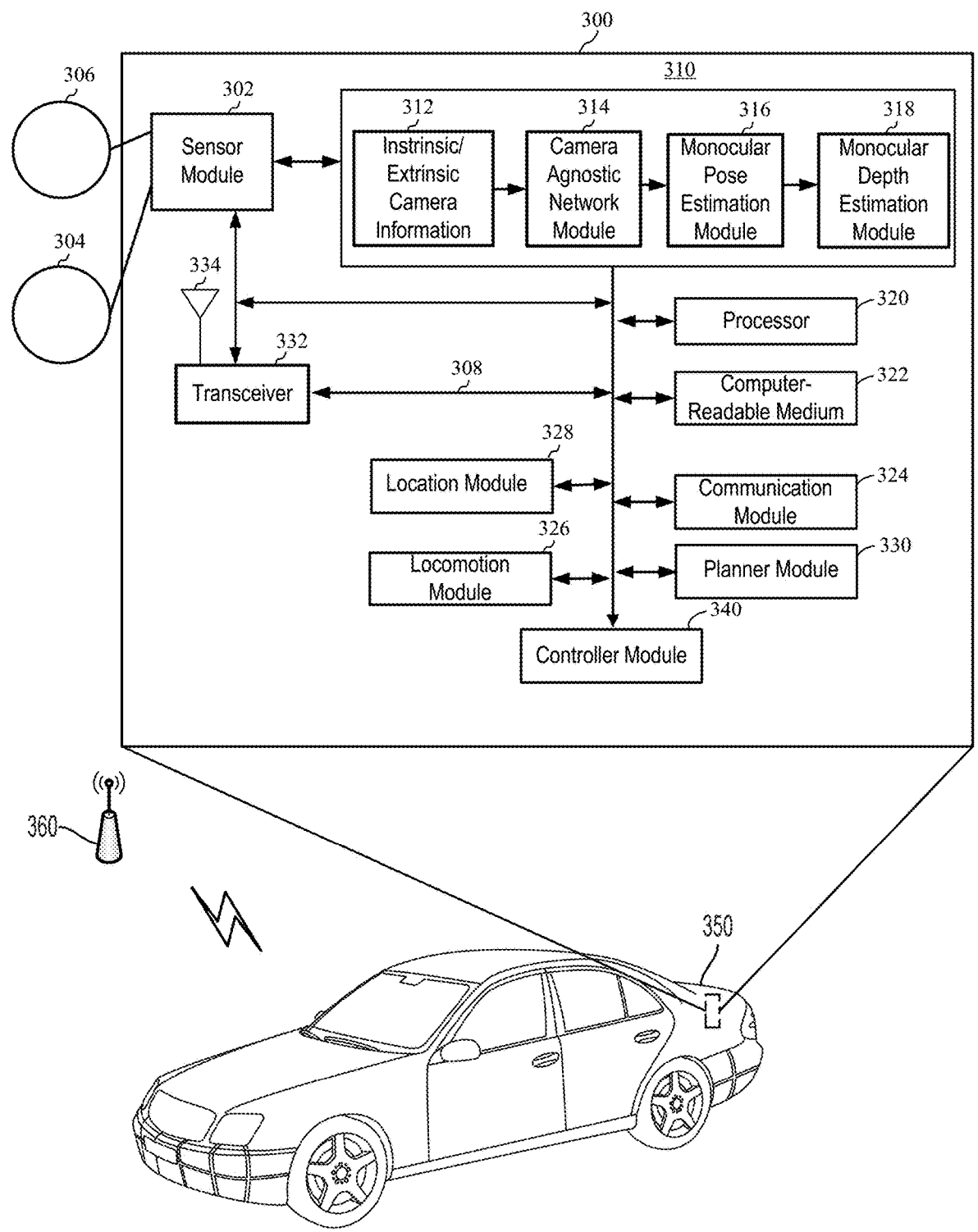
FIG. 3 is a diagram illustrating an example of a hardware implementation for a camera agnostic monocular depth system, according to aspects of the present disclosure.

FIG. 3 is a diagram illustrating an example of a hardware implementation for a camera agnostic monocular depth system 300, according to aspects of the present disclosure. The camera agnostic monocular depth system 300 may be configured for planning and control of an ego vehicle in response to monocular (single-camera) depth and pose estimation during training of a car 350. The camera agnostic monocular depth system 300 may be a component of a vehicle, a robotic device, or other device. For example, as shown in FIG. 3, the camera agnostic monocular depth system 300 is a component of the car 350. Aspects of the present disclosure are not limited to the camera agnostic monocular depth system 300 being a component of the car 350, as other devices, such as a bus, motorcycle, or other like vehicle, are also contemplated for using the camera agnostic monocular depth system 300. The car 350 may be autonomous or semi-autonomous.

The camera agnostic monocular depth system 300 may be implemented with an interconnected architecture, represented generally by an interconnect 308. The interconnect 308 may include any number of point-to-point interconnects, buses, and/or bridges depending on the specific application of the camera agnostic monocular depth system 300 and the overall design constraints of the car 350. The interconnect 308 links together various circuits including one or more processors and/or hardware modules, represented by a sensor module 302, an ego perception module 310, a processor 320, a computer-readable medium 322, communication module 324, a locomotion module 326, a location module 328, a planner module 330, and a controller module 340. The interconnect 308 may also link various other circuits, such as timing sources, peripherals, voltage regulators, and power management circuits, which are well known in the art and, therefore, will not be described any further.

The camera agnostic monocular depth system 300 includes a transceiver 332 coupled to the sensor module 302, the ego perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects and/or planned actions from the ego perception module 310 to a server (not shown).

The camera agnostic monocular depth system 300 includes the processor 320 coupled to the computer-readable medium 322. The processor 320 performs processing, including the execution of software stored on the computer-readable medium 322 to provide functionality, according to the present disclosure. The software, when executed by the processor 320, causes the camera agnostic monocular depth system 300 to perform the various functions described for ego vehicle perception based on monocular depth and pose estimation from video captured by a camera agnostic depth network of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the ego perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication-Physical layer using microwave at 5.9 GHz (review); EN 12795: 2002 Dedicated Short-Range Communication (DSRC)—DSRC Data link layer: Medium Access and Logical Link Control (review); EN 12834:2002 Dedicated Short-Range Communication—Application layer (review); EN 13372: 2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the camera agnostic monocular depth system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The camera agnostic monocular depth system 300 also includes the planner module 330 for planning a selected route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The ego perception module 310 may be in communication with the sensor module 302, the processor 320, the computer-readable medium 322, the communication module 324, the locomotion module 326, the location module 328, the planner module 330, the transceiver 332, and the controller module 340. In one configuration, the ego perception module 310 receives sensor data from the sensor module 302. The sensor module 302 may receive the sensor data from the first sensor 304 and the second sensor 306. According to aspects of the present disclosure, the ego perception module 310 may receive sensor data directly from the first sensor 304 or the second sensor 306 to perform monocular depth and pose estimation from images captured by the first sensor 304 or the second sensor 306 of the car 350, based on training using a camera agnostic network.

In robotics and 3D computer vision, a camera model that relates image pixels and 3D world points is a prerequisite for many tasks, including visual odometry, depth estimation, and 3D object detection. A perspective pinhole camera model is ubiquitous due to its simplicity because this camera model has few parameters and is easy to calibrate. Deep neural architectures that rely on the pinhole camera model have led to major advances in tasks such as monocular 3D detection and depth estimation. These deep neural networks are generally trained on curated and rectified image datasets in which a use of a pinhole camera is assumed. There are a variety of settings, however, where this assumption does not hold. For example, physical arrangements of fisheye and catadioptric lenses break the pinhole assumption (e.g., a dashboard camera behind a windshield, or a system of multiple cameras).

The pinhole model allows for closed form lifting and projection operations, and thus can be easily used as a module in deep architectures (e.g., either fixed and precomputed or learned). Parametric distortion models, as well as models for more complex lens designs (e.g., fisheye cameras), are generally significantly more complex and harder to calibrate relative to pinhole cameras. Adapting these models to learn depth and ego-motion involves two major disadvantages: (1) distortion models are generally a simplification of complex lens distortion, leading to approximate correctness; and (2) new differentiable projection models are individually created for each type of camera. The resulting architecture is then specialized to a single camera model, and is significantly modified before being used to train on a new dataset from a novel camera.

Instead of adapting individual camera models, aspects of the present disclosure are directed to an end-to-end self-supervised learning of a neural camera model from raw, non-calibrated videos in addition to depth and ego-motion. The generic camera model directly relates pixels to viewing rays, allowing for a per-pixel calibration that can model any distortion or lens system. A camera agnostic model can be trained without modification on datasets captured with radically different cameras. For example, the camera agnostic model supports learning of depth and ego-motion on pinhole, fisheye, and catadioptric datasets. The camera agnostic model can learn accurate depth maps and odometry where the standard perspective-based architecture (which is an incorrect model for non-pinhole lenses) diverges. The camera agnostic model is a learning-based self-supervised monocular technique.

As shown in FIG. 3, the ego perception module 310 includes intrinsic/extrinsic camera information 312, a camera agnostic network module 314, a monocular pose estimation module 316, and a monocular depth estimation module 318. The camera agnostic network module 314, the camera agnostic network module 314, the monocular pose estimation module 316, and the monocular depth estimation module 318 may be components of a same or different artificial neural network, such as a deep convolutional neural network (CNN). The ego perception module 310 is not limited to a deep CNN backbone.

The ego perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images. The camera information from the first sensor 304 may be projected into a camera agnostic configuration according to the camera agnostic network module 314. Accordingly, the camera agnostic network module 314 enables training of the monocular pose estimation module 316 and the monocular depth estimation module 318 with a much larger dataset based on different cameras, both at training time and testing time.

The ego perception module 310 is configured to perform monocular depth and pose estimation for autonomous operation of the car 350. According to aspects of the present disclosure, the camera agnostic network module 314 enables depth and pose estimations that can be utilized across a vast array of different cameras, which may be referred to as camera agnostic depth networks. The camera agnostic network module 314 trains both depth and pose estimations using a network of different cameras, both at training and testing time. Camera information used by the camera agnostic network includes intrinsic and extrinsic camera information. For example, extrinsic parameters may define the location and orientation of the camera with respect to a world frame. Intrinsic parameters may allow a mapping between camera coordinates and pixel coordinates in an image frame, as shown in FIGS. 4A-4C.

Figure 4C:
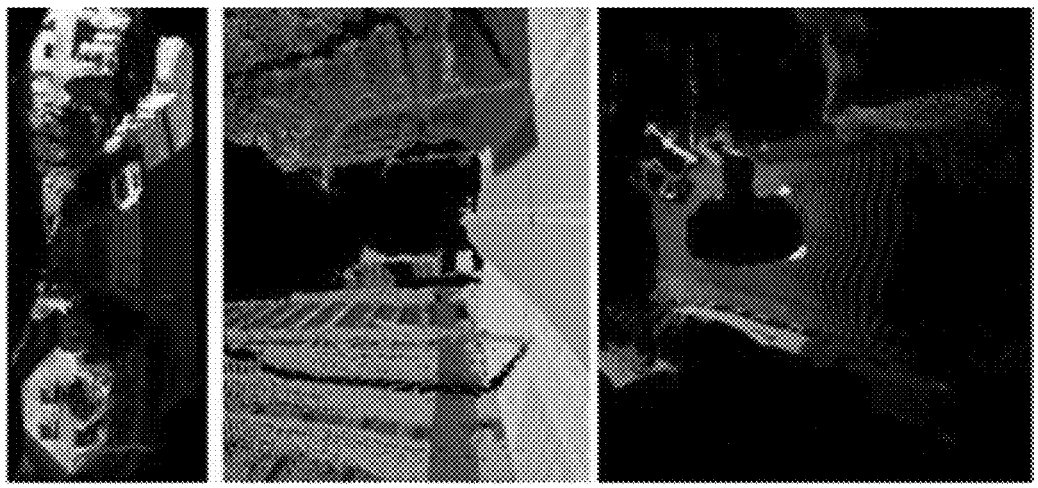
FIGS. 4A-4C show drawings illustrating self-supervised monocular depth and pose estimation for an array of cameras, according to aspects of the present disclosure.
Figure 4B:
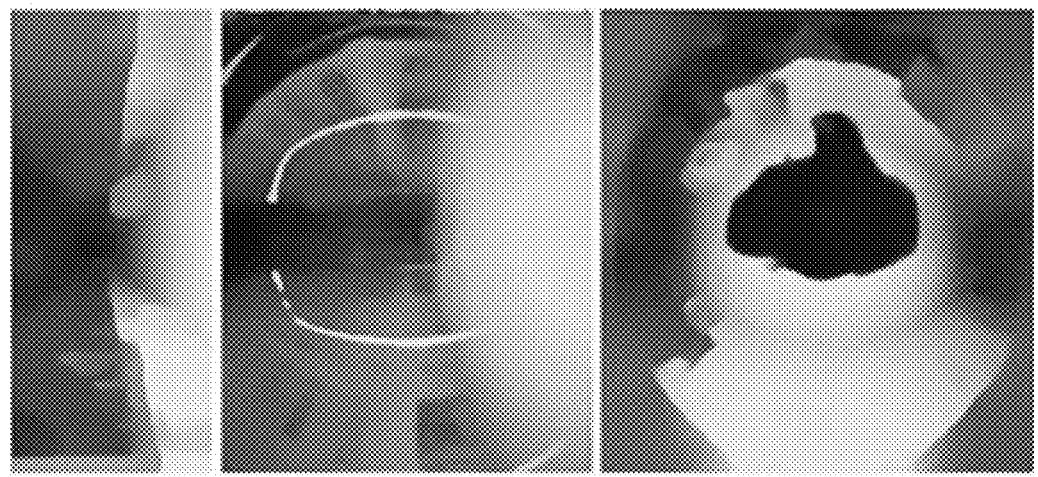
Figure 4A:
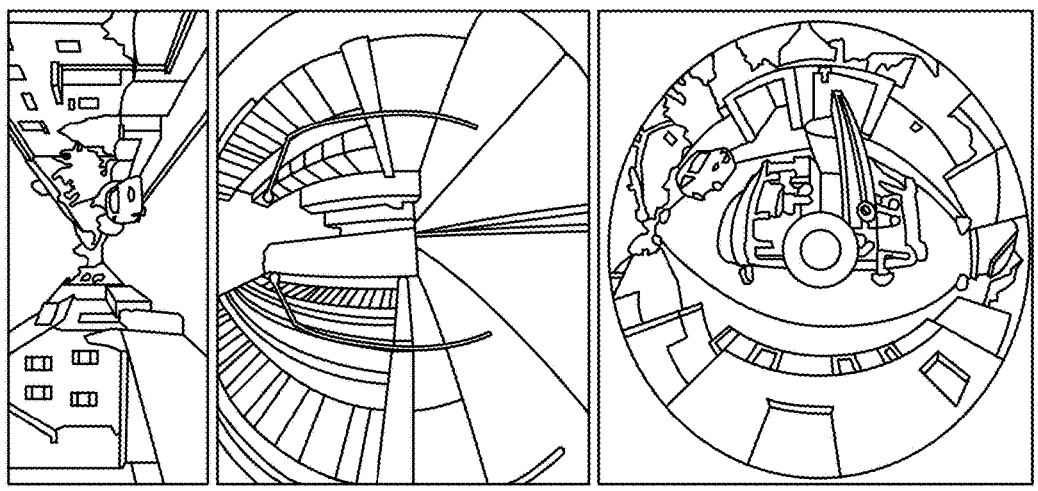

FIGS. 4A-4C show drawings illustrating self-supervised monocular depth and pose estimation for an array of cameras, according to aspects of the present disclosure. FIG. 4A illustrates an input of a monocular video scene 400 captured with a pinhole camera (first row), a fisheye camera (second row), and a catadioptric camera (third row).

FIG. 4B illustrates a depth map of the monocular video scene 400 of FIG. 4A captured with the pinhole camera (first row), the fisheye camera (second row), and the catadioptric camera (third row).

FIG. 4C illustrates a point cloud of the monocular video scene 400 of FIG. 4A and the depth map of FIG. 4B, captured with the pinhole camera (first row), the fisheye camera (second row), and the catadioptric camera (third row). Aspects of the present disclosure replace the standard pinhole model generally used in self-supervised, monocular settings with a camera agnostic network model, enabling the learning of depth and pose estimates for any kind of camera, as illustrated in FIGS. 4A-4C.

Figure 5:
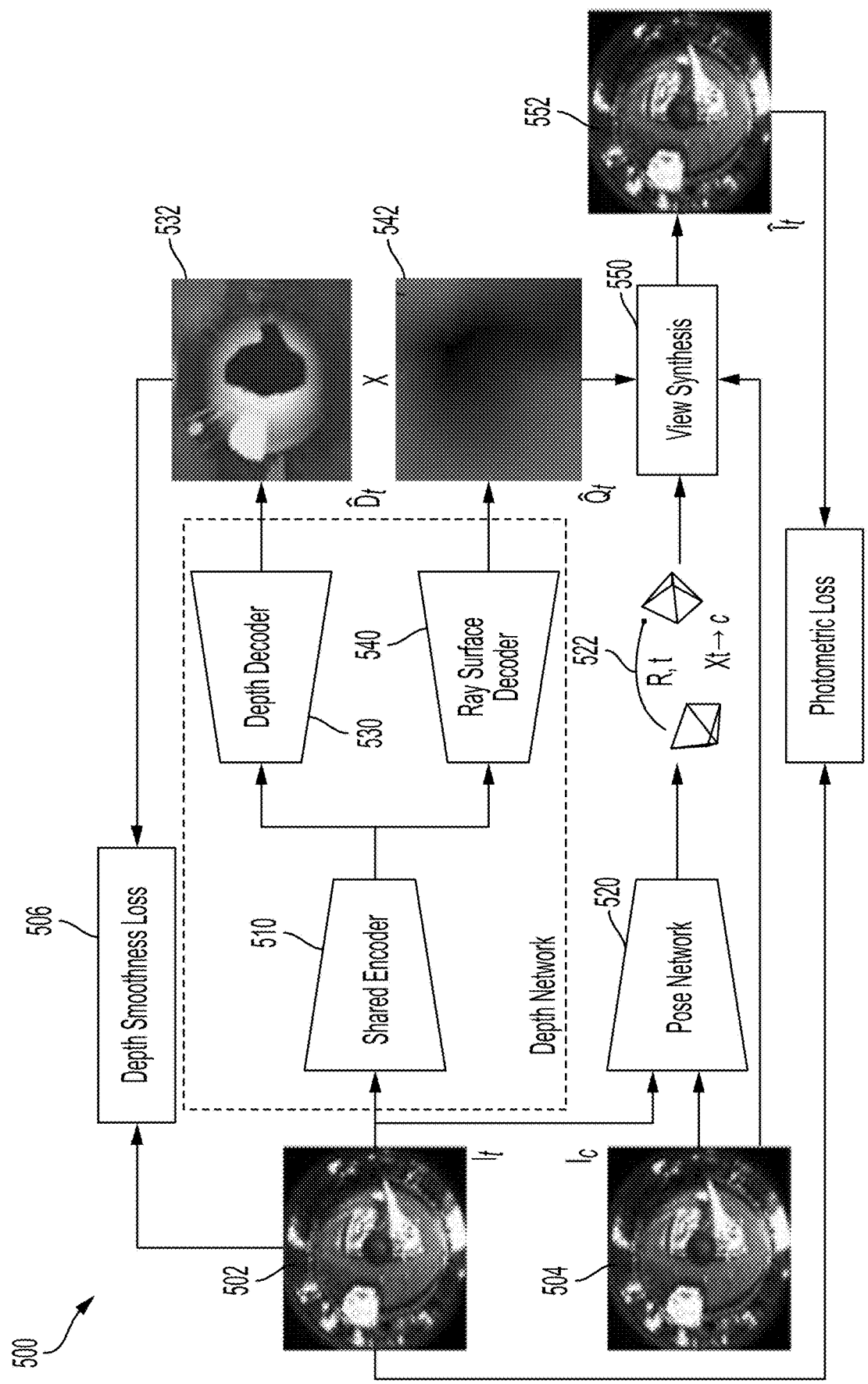
FIG. 5 is a block diagram illustrating a self-supervised monocular depth/pose estimation framework based on an agnostic camera network, according to aspects of the present disclosure.

FIG. 5 is a block diagram illustrating a self-supervised monocular depth/pose estimation framework based on an agnostic camera network, according to aspects of the present disclosure. In one aspect of the present disclosure, a monocular depth/pose estimation framework 500 is used to implement the ego perception module 310 shown in FIG. 3 using, for example, a camera agnostic network. In further aspects of the present disclosure, the monocular depth/pose estimation framework 500 enables learning of depth and pose estimates for any kind of camera, as illustrated in FIGS. 4A-4C.

In one configuration, the monocular depth/pose estimation framework 500 receives two consecutive images, a target image ($I_t$) 502 and a context image ($I_c$) 504 of a monocular video. In this configuration, the target image $I_t$ 502 is provided as input to a shared encoder 510 and a pose network 520. The context image 504 is also provided to the pose network 520. An output of the pose network 520 feeds an image projection 522 into a camera agnostic configuration. The image projection 522 is fed as an input to a view synthesis block 550. This image projection 522 enables training of monocular depth and pose models using much larger datasets by leveraging information from any camera. The context image 504 is also fed as an input to the view synthesis block 550.

In one configuration of the monocular depth/pose estimation framework 500, an output of the shared encoder 510 feeds a depth decoder 530 and a ray surface decoder 540. The depth decoder 530 outputs a predicted depth map 532 ($\hat{D}_t$), and the ray surface decoder 540 outputs a predicted ray surface 542 ($\hat{Q}_t$). In this configuration, the predicted depth map 532 and the predicted ray surface 542 are combined, and the combination is fed as an input to the view synthesis block 550. The view synthesis block 550 is configured to predict a warped target image 552 ($\hat{I}_t$). In addition, the combination of the predicted depth map 532 and the predicted ray surface 542 is provided as feedback to a depth smoothness loss block 506, which also receives the target image ($I_t$) 502 as input.

In this configuration, both the depth decoder 530 and the ray surface decoder 540 share the same encoder backbone (e.g., the shared encoder 510). According to this aspect of the present disclosure, combining the predicted depth map 532 (DO with the predicted ray surface 542 ($\hat{Q}_t$) enables performance of view synthesis by the view synthesis block 550. In this configuration, the monocular depth/pose estimation framework 500 performs self-supervised learning to predict the warped target image 552 ($\hat{I}_t$) by the view synthesis block 550. The warped target image 552 ($\hat{I}_t$) is provided as feedback to a photometric loss block 508, which also receives the target image ($I_t$) 502 as input. The monocular depth/pose estimation framework 500 is described in further detail below.

1. Self-Supervised Depth and Pose Estimation

In a self-supervised monocular structure-from-motion setting, an objective is to learn: (a) a depth model fd: I→D, that predicts a depth value $\hat{d}=f_d(I(p))$ for every pixel $p=[u, v]^T$ in the target image $I_t$ (up to a scale factor); and (b) an ego-motion model $f_x$: $(I_t, I_C) \to X_{t \to C}$, that predicts the rigid transformations for all $c \in C$ given by $$X_{t \to C} = \begin{pmatrix} R t \\ 0 1 \end{pmatrix} \in SE(3),$$

between the target image It and a set of context images $I_c \in I_C$, taken as adjacent frames in a video sequence.

1.1 Objective Loss

As shown in FIG. 5, the monocular depth/pose estimation framework 500 relies on a depth network (e.g., 510, 530, and 540) and a pose network 520 that are simultaneously trained in a self-supervised manner. This simultaneous training may be performed by projecting pixels in the image projection 522 from the context image $I_c$ 504 onto the target image $I_t$, 502. The simultaneous training includes minimizing the photometric re-projection error between the original target image $I_t$ 502 and the warped target image 552 $\hat{I}_t$ (e.g., synthesized images). An image synthesis operation of view synthesis block 550 is performed using, for example, spatial transformer networks (STNs), via grid sampling with bilinear interpolation. As a result, the image synthesis operation is fully differentiable. This pixel-wise warping to form the warped target image 552 $\hat{I}_t$ is depicted in FIG. 6A (described below) and takes the form of:

$$\hat{p}_t = \pi_c(R_{t \to c}\phi_t(p_t, d_t) + t_{t \to c}) \quad (1)$$

where $\phi(p, d)=P$ is responsible for the lifting of an image pixel in homogeneous coordinates $p=[u, v, 1]^T$ to a 3D point $P=[x, y, z]^T$ given its depth value d. Conversely, $\pi(P)=p$ projects a 3D point back onto the image plane as a pixel. For the standard pinhole camera model, used in most of the current learning-based monocular depth estimation algorithms, these functions have a closed-form solution and can be calculated as:

$$\phi(p, d) = dK^{-1}p = d \begin{bmatrix} f_x & 0 & c_x \\ 0 & f_y & c_y \\ 0 & 0 & 1 \end{bmatrix}^{-1} [u\,v\,1]^T, \quad (2)$$

$$\pi(P) = \frac{1}{P_z}KP = \frac{1}{z}\begin{bmatrix} f_x & 0 & c_x \\ 0 & f_y & c_y \\ 0 & 0 & 1 \end{bmatrix}[x\,y\,z]^T, \quad (3)$$

with intrinsic matrix K, focal length ($f_x$, $f_y$) and principal point ($c_x$, $c_y$). These parameters are usually assumed to be known, obtained using prior independent calibration techniques, or are learned as additional variables during the training stage. The self-supervised objective loss to be minimized is of the form:

$$\mathcal{L} = (I_t, \hat{I}_t) = \mathcal{L}_p(I_t, I_C) + \lambda_d \mathcal{L}_d(\hat{D}_t), \quad (4)$$

which is the combination of an appearance-based loss $\mathcal{L}_p$ and a weighted depth smoothness loss $\mathcal{L}_d$, described below in more detail. This loss is then averaged per pixel and batch during training to produce the final value to minimize. For simplicity, dynamic objects (which break the static scene assumption) are not explicitly modeled, although these could be easily incorporated into our framework to further improve experimental results.

Appearance-Based Loss.

The similarity between target $I_t$ and warped $\hat{I}_t$ images is estimated at the pixel level using structural similarity (SSIM) combined with an L1 loss term:

$$\mathcal{L}_p(I_t, \hat{I}_t) = \alpha \frac{1 - SSIM(I_t, \hat{I}_t)}{2} + (1-\alpha)\|I_t, \hat{I}_t\| \quad (5)$$

In order to increase robustness against parallax or the presence of dynamic objects, a minimum pixel-wise photometric loss value is considered for each context image in $I_C$. The intuition is that the same pixel will not be occluded or out-of-bounds in all context images, and its association with minimal photometric loss should be correct. Similarly, we mask out static pixels by removing those with a warped photometric loss $\mathcal{L}_p(I_t, \hat{I}_t)$ higher than their original photometric loss $\mathcal{L}_p(I_t, I_c)$.

Depth Smoothness Loss.

To regularize the depth in image regions without texture, aspects of the present disclosure incorporate an edge-aware term that penalizes high depth gradients in areas with low color gradients:

$$\mathcal{L}_s(\hat{D}_t) = |\delta_x \hat{D}_t| e^{-|\delta_x I_t|} + |\delta_y \hat{D}_t| e^{-|\delta_y I_t|} \quad (6)$$

2. Camera Agnostic Model

The monocular depth/pose estimation framework 500 is configured according to a camera agnostic model for a self-supervised learning framework capable of jointly estimating depth and pose in an end-to-end differentiable manner. Our method can be trained on raw unlabeled videos captured from a wide variety of camera geometries without any calibration or architectural modification, thus broadening the use of self-supervised learning in the wild. The monocular depth/pose estimation framework 500 enables visual odometry and depth estimation on pinhole, fisheye, and catadioptric cameras, although other types of cameras are contemplated.

Figure 6B:
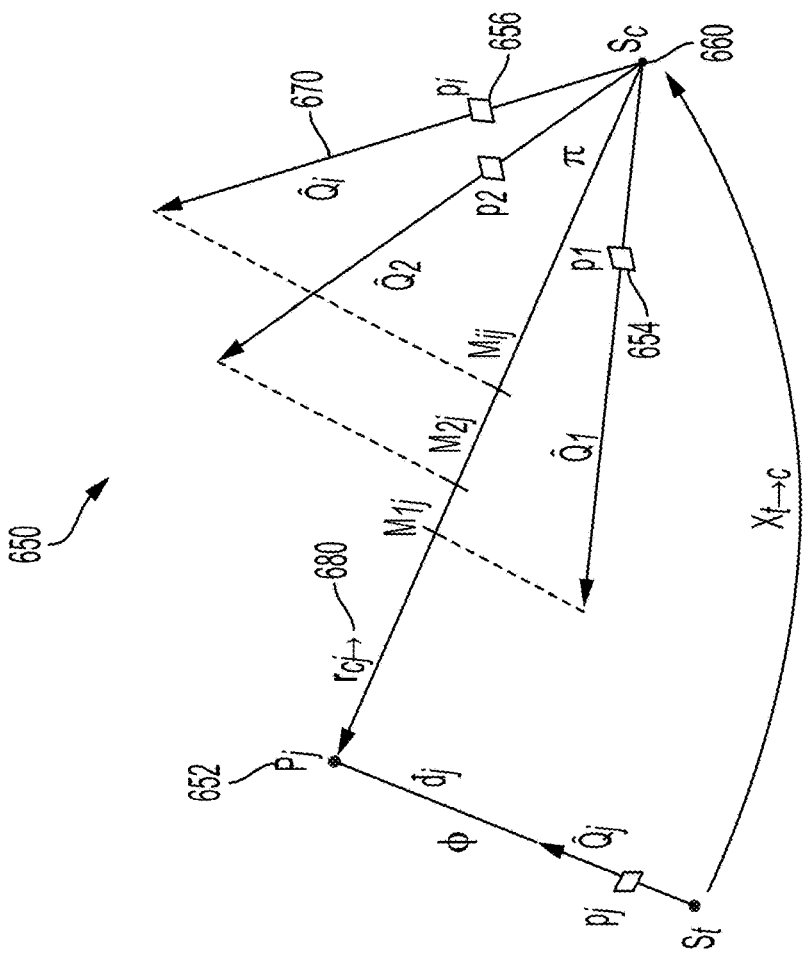
FIGS. 6A and 6B illustrate lifting and projection operations for a standard pinhole model in FIG. 6A and a camera agnostic model in FIG. 6B, according to aspects of the present disclosure.
Figure 6A:
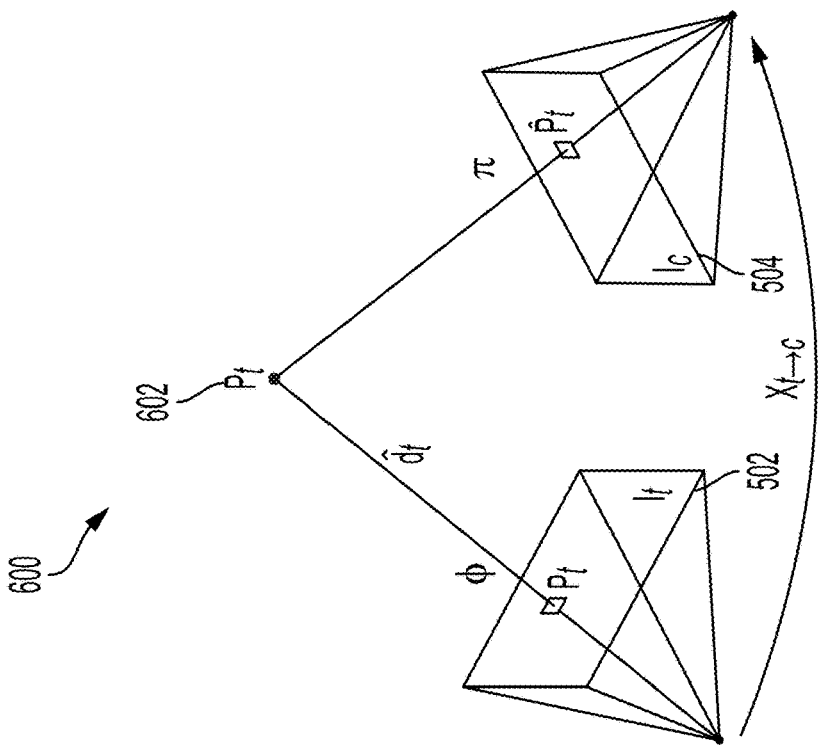

FIGS. 6A and 6B illustrate lifting ($\phi$) and projection ($\pi$) operations for a standard pinhole model 600 in FIG. 6A and a camera agnostic model 650 in FIG. 6B, according to aspects of the present disclosure. The lifting ($\phi$) and projection ($\pi$) operations according to Equation (1) are shown for a single pixel $p_j$ 652, considering a target image $I_t$ 502 and context image $I_c$ 504. As shown in FIG. 6B, straight arrows represent unitary ray surface vectors Q(p), drawn out of scale to facilitate visualization. In this example, $p_1$ 654 is associated with the single pixel $p_j$ 652 because $p_1$ 654 satisfies Equation (9), as described in further detail below.

Generally, a camera model may be defined by two operations: the lifting of 3D points from image pixels (e.g., $\phi$ (p, $_d$)=P; and the projection of 3D points onto the image plane (e.g., $\pi$(P)=p). A standard pinhole perspective model may provide simple closed-form solutions to these two operations, as matrix-vector products (see Equations (2)-(3) and FIG. 6A). In a generic camera model, the camera model is composed of a ray surface that associates each pixel with a corresponding direction, offering a completely generic association between 3D points and image pixels. In this model, although lifting is simple and can be computed in closed form, the projection operation has no closed-form solution and is non-differentiable, which makes it unsuitable for learning-based applications, as shown in FIG. 6B. Below, a variant of the generic camera model is described that is differentiable and, thus, amenable to end-to-end learning in a self-supervised monocular setting.

2.1 Notation

According to aspects of the present disclosure, monocular depth/pose estimation may be formulated as follows. The following notation is used: for each pixel p=[u, v]$^T$, a corresponding camera center S(u, v) is introduced as a 3D point and a unitary ray surface vector Q(u, v)$\in \mathbb{R}^3$, with D(u, v) representing the scene depth along the ray. Note that, for central cameras, the camera center is the same for all points, so that S(u, v)=S, $\forall$(u, v). The monocular depth/pose estimation framework 500, shown in FIG. 5 represents the full training architecture according to aspects of the present disclosure. The monocular depth/pose estimation framework 500 is configured to produce a ray surface estimate, $f_r: I \to Q$, by adding the ray surface decoder 540 to the depth decoder 530, in which the ray surface decoder 540 is configured to generate the predicted ray surface 542 ($\hat{Q}=f_r(I)$).

2.2 Lifting

In aspects of the present disclosure, given the above definitions, for any pixel p, a corresponding 3D point P as follows:

$$P(u,v) = S(u,v) + \hat{D}(u,v)\hat{Q}(u,v) \quad (7)$$

In other words, the predicted ray vector $\hat{Q}(u, v)$ is scaled and offset by the camera center S(u, v), which is the same for all pixels in a central camera. Nevertheless, because the monocular depth/pose estimation framework 500 operates in a self-supervised monocular learning-based setting, the resulting depth and pose estimates are generated up to a scale factor. In other words, for simplicity and without loss of generality, the camera center is assumed to coincide with the origin of the reference coordinate system and set S(u, v)=[0, 0, 0]$^T \forall u, v \in I$.

2.3 Projection

Consider $\mathcal{P}_t = \{P_j\}_{j=1}^{HW}$ 602, produced by lifting pixels from the target image $I_t$ 502 as 3D points. In the standard pinhole camera model of FIG. 6A, projection is a simple matrix-vector product (Equation 3). For the proposed neural camera model, however, for each 3D point (e.g., single pixel $P_j$ 652), the corresponding pixel $p_i \in I_c$ 656 with a ray surface vector $\hat{Q}_i = \hat{Q}_c(p_i)$ 670 that most closely matches the direction of the single pixel $P_j$ 652 to a camera center $S_c$ 660 is computed, as shown in FIG. 6B. This direction may be referred to $r_{c \to j} = P_j - S_c$ 680. Thus, $p_i^*$ is computed such that:

$$p_i^* = \underset{p_i \in I_c}{\mathrm{argmax}} \langle \hat{Q}_c(P_i), r_{c \to j} \rangle \quad (8)$$

Solving this problem involves searching over the entire ray surface $\hat{Q}_c$ and can be computationally expensive: a camera producing images of resolution H×W would involve a total of (HW)$^2$ evaluations, as each 3D point from $\mathcal{P}_t$ can be associated with any pixel from $I_c$. Additionally, the argmax operation is non-differentiable, which precludes its use in an end-to-end learning-based setting. Solutions are described to each of these issues below, that in conjunction enable the simultaneous learning of depth, pose, and the proposed neural camera model in a fully self-supervised monocular setting.

Softmax Approximation.

To project the 3D points $\mathcal{P}_t$ 602 onto the context image $I_c$ 504, for each $p_j \in \mathcal{P}_t$, the corresponding pixel $p_i \in I_c$ 656 is determined with a surface ray $\hat{Q}_i$ 670 closest to the direction $r_{c \to j} = P_j - S_c$ 680. Taking the dot product of each direction $r_{c \to j}$ 680 with each ray vector $\hat{Q}_i$ 670, an $(H \times W)^2$ tensor M is obtained, in which each coefficient $M_{ij} = \langle \hat{Q}_i, r_{c \to j} \rangle = M(p_i, P_j)$ represents the similarity between $\hat{Q}_i$ 670 and $r_{c \to 1}$ 680. Using this notation, projection for the proposed neural camera model is given by selecting the i* index for each single pixel $P_j$ 652 with:

$$i^* = \underset{i}{\operatorname{argmax}} M(p_i, P_j) \tag{9}$$

To make this projection operation differentiable, argmax with a softmax are substituted with a temperature $\tau$, thus obtaining a new tensor M defined as:

$$\tilde{M}(p_i, P_j) = \frac{\exp(M(p_i, P_j)/\tau)}{\left(\sum_i \exp(M(p_i, P_j)/\tau)\right)} \tag{10}$$

The temperature is annealed over time so that the tensor becomes approximately one-hot for each pixel. A 2D-3D association is obtained and used for projection by multiplying with a vector of pixel indices. Thus, projection can now be implemented in a fully differentiable manner using, for example, spatial transformer networks (STNs).

Residual Ray Surface Template.

In the structure-from-motion setting, learning a randomly initialized ray surface is similar to learning 3D scene flow, which is a challenging problem when no calibration is available, particularly when considering self-supervision. To avoid this random initialization, instead a residual ray surface $\hat{Q}_r$ is learned and added to a fixed ray surface template $Q_0$ to produce $\hat{Q} = Q_0 + \lambda_r \hat{Q}_r$. The introduction of such a template allows the injection of geometric priors into the learning framework, since if some form of camera calibration is known—even if only an approximation—the corresponding ray surface is generated and used as a starting point for further refinement using the learned ray surface residual. If no such information is available, a "dummy" template is initialized based on a pinhole camera model, obtained by lifting a plane at a fixed distance (e.g., Equation (2)) and the surface is normalized. For stability, training is initiated with solely the template $Q_0$, with the gradual introduction of the residual $\hat{Q}_r$, by increasing the value of $\lambda_r$. Interestingly, this pinhole prior significantly improves training stability and convergence speed even in a decidedly non-pinhole setting (e.g., catadioptric cameras).

Patch-Based Data Association.

In the most general version of the proposed neural camera model, rays at each pixel are independent and can point in completely different directions. Consequently, Equation (9) specifies searching over the entire image, which quickly becomes computationally infeasible at training time even for lower resolution images, both in terms of speed and memory footprint. To alleviate such heavy burden, the optimal projection search (e.g., Equation (10)) is restricted to a small h×w grid in the context image $I_c$ 504 surrounding the (u, v) coordinates of the target pixel $p_t$ 602. The motivation, in most cases, is based on the assumption that camera motion is small enough to produce correct associations within this neighborhood, especially when using the residual ray surface template described above. To further reduce memory burdens, the search is performed on the predicted ray surface at half-resolution, which is then upsampled using bilinear interpolation to produce pixel-wise estimates. At test-time none of these approximations are necessary, and a full-resolution ray surface is predicted directly from the input image.

Figure 7:
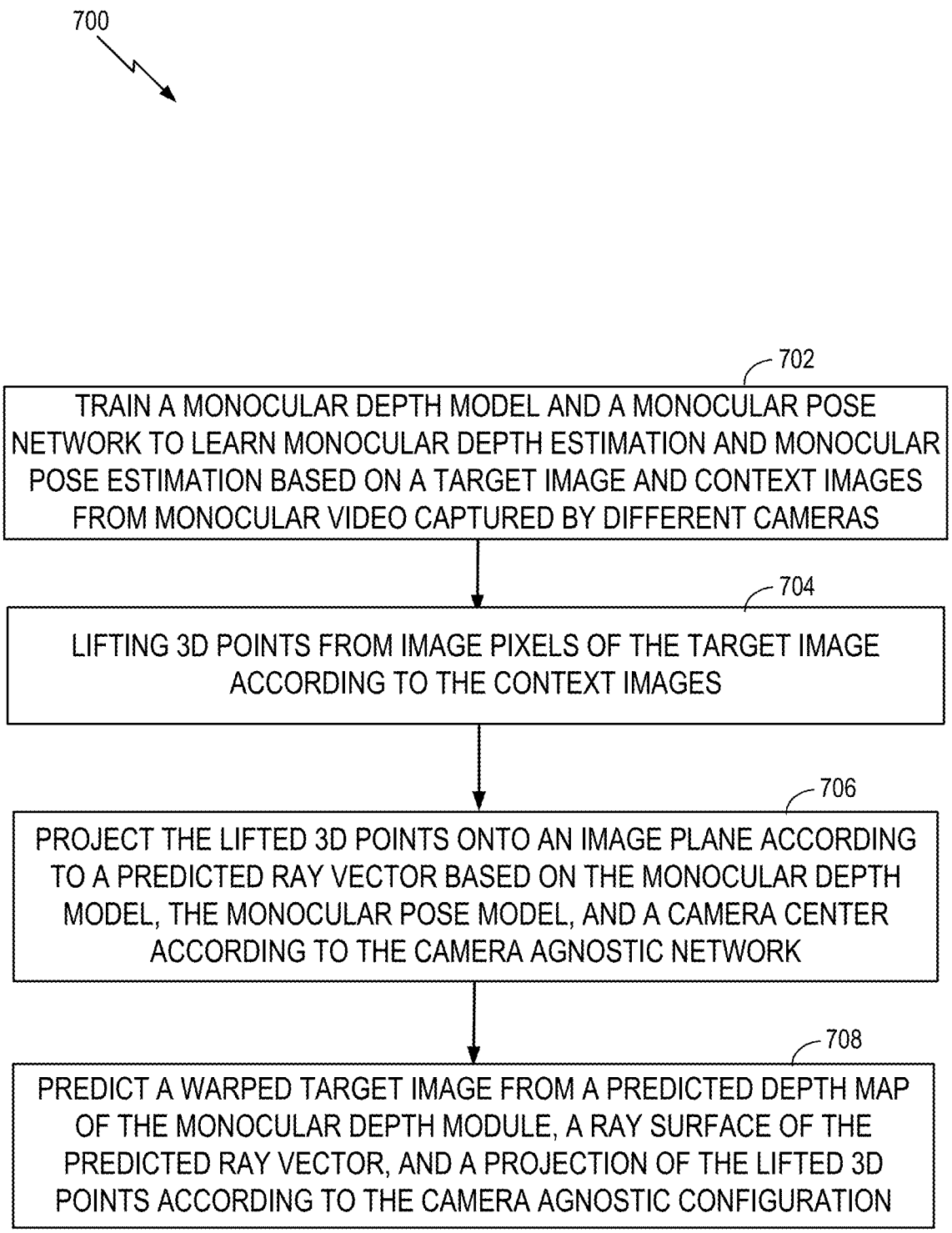
FIG. 7 is a flowchart illustrating a method for monocular visual odometry based on learned, depth-aware keypoints, according to aspects of the present disclosure.

FIG. 7 is a flowchart illustrating a method for monocular depth/pose estimation in a camera agnostic network, according to aspects of the present disclosure. The method 700 begins at block 702, in which a monocular depth model and a monocular pose network are trained to learn monocular depth estimation and monocular pose estimation based on a target image and context image from monocular video captured by different cameras. For example, as shown in FIG. 5, the monocular depth/pose estimation framework 500 relies on a depth network (e.g., 510, 530 and 540) and a pose network 520 that are simultaneously trained in a self-supervised manner. This simultaneous training may be performed by projecting pixels in the image projection 522 from the context image $I_c$ 504 onto the target image $I_t$ 502. The simultaneous training includes minimizing the photometric re-projection error between the original target image $I_t$ 502 and the warped target image 552 $\hat{I}_t$ (e.g., synthesized).

At block 704, 3D points are lifted from image pixels of the target image according to the one or more context images. At block 706, the lifted 3D points are projected onto an image plane according to a predicted ray vector based on the monocular depth model, the monocular pose model, and a camera center according to the camera agnostic network. For example, as shown in FIG. 6B, for each 3D point (e.g., single pixel $P_j$ 652), the corresponding pixel $p_i \in I_c$ 656 with a ray surface vector $\hat{Q}_i = \hat{Q}_c(p_i)$ 670 that most closely matches the direction of the single pixel $P_j$ 652 to a camera center $S_c$ 660 is computed. This direction may be referred to as $r_{c \to j} = P_j - S_c$ 680.

At block 708, a warped target image is predicted from a predicted depth map of the monocular depth module, a ray surface of the predicted ray vector, and a projection of the lifted 3D points according to the camera agnostic configuration. For example, as shown in FIG. 5, the monocular depth/pose estimation framework 500 relies on a depth network (e.g., 510, 530 and 540) and a pose network 520 that are simultaneously trained in a self-supervised manner. This simultaneous training may be performed by projecting pixels in the image projection 522 from the context image $I_c$ 504 onto the target image $I_t$ 502. The simultaneous training includes minimizing the photometric re-projection error between the original target image $I_t$ 502 and warped target image 552 $\hat{I}_t$. An image synthesis operation of view synthesis block 550 is performed using, for example, spatial transformer networks (STNs), via grid sampling with bilinear interpolation.

The method 700 may also include estimating a trajectory of an ego vehicle based on the warped target image. For example, as shown in FIG. 5, in the monocular depth/pose estimation framework 500 the warped target image 552 predicts rigid transformations between the target image and the one or more context images of adjacent frames of monocular video to estimate ego motion of an ego vehicle. The method 700 also includes planning a trajectory of an ego vehicle according to the estimated trajectory of the ego vehicle, for example, as performed by the planner module 330 and/or the controller module 340 shown in FIG. 3. Ego vehicle perception using monocular depth/pose estimation framework 500 for monocular ego-motion estimation from a single camera of the car 350 is beneficially improved according to aspects of the present disclosure.

Aspects of the present disclosure provide a modification to standard depth and pose estimations by incorporating camera information. Incorporating camera information into standard depth and pose estimations leads to estimates that are much more robust. The modified depth and pose estimations use a network of different cameras, both at training and testing time. This camera network enables training of monocular depth and pose models using much larger datasets. According to aspects of the present disclosure, the larger datasets leverage information from any camera in a similar way by projecting this information into a camera agnostic configuration. The camera information includes intrinsic and extrinsic camera information. For example, extrinsic parameters may define the location and orientation of the camera with respect to a world frame. Intrinsic parameters may allow a mapping between camera coordinates and pixel coordinates in an image frame.

In some aspects of the present disclosure, the method 700 may be performed by the SOC 100 (FIG. 1) or the software architecture 200 (FIG. 2) of the ego vehicle 150 (FIG. 1). That is, each of the elements of method 700 may, for example, but without limitation, be performed by the SOC 100, the software architecture 200, or the processor (e.g., CPU 102), and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for monocular depth/pose estimation in a camera agnostic network, the method comprising:
   training a monocular depth model and a monocular pose model to learn monocular depth estimation and monocular pose estimation based on a target image and one or more context images from monocular video captured by the camera agnostic network;
   lifting 3D points from image pixels of the target image according to the one or more context images;
   projecting the lifted 3D points onto an image plane according to a predicted ray vector based on the monocular depth model, the monocular pose model, and a camera center according to the camera agnostic network; and predicting a warped target image from a predicted depth map of the monocular depth model, a ray surface of the predicted ray vector, and a projection of the lifted 3D points according to the camera agnostic network.

2. The method of claim 1, in which training comprises self-supervised learning of the monocular depth estimation, the monocular pose estimation, and a unitary ray vector estimation.

3. The method of claim 1, in which training comprises self-supervised learning of an ego-motion model to predict rigid transformations between the target image and the one or more context images captured by the camera agnostic network, in which the one or more context images represent adjacent frames of monocular video.

4. The method of claim 1, in which training comprises incorporating intrinsic parameters and extrinsic parameters regarding the plurality of different cameras into a camera agnostic configuration of the monocular depth model and the monocular pose model.

5. The method of claim 4, in which the extrinsic parameters define a location and orientation of the plurality of different cameras with respect to a world frame, and the intrinsic parameters enable a mapping between camera coordinates and pixel coordinates in an image frame.

6. The method of claim 1, further comprising estimating a pose transformation from the target image to the one or more context images based on predicted rigid transformations between the target image and the one or more context images captured by the camera agnostic network, in which the one or more context images represent adjacent frames of monocular video.

7. The method of claim 1, further comprising estimating a trajectory of an ego vehicle based on the warped target image.

8. The method of claim 7, further comprising planning a trajectory of the ego vehicle according to an estimated trajectory of the ego vehicle.

9. The method of claim 1, further comprising:
scaling the predicted ray vector according to a predicted depth; and
offsetting the predicted ray vector by the camera center.

10. A non-transitory computer-readable medium having program code recorded thereon for monocular depth/pose estimation in a camera agnostic network, the program code being executed by a processor and comprising:
program code to train a monocular depth model and a monocular pose model to learn monocular depth estimation and monocular pose estimation based on a target image and one or more context images from monocular video captured by the camera agnostic network;
program code to lift 3D points from image pixels of the target image according to the one or more context images;
program code to project the lifted 3D points onto an image plane according to a predicted ray vector based on the monocular depth model, the monocular pose model, and a camera center according to the camera agnostic network; and
program code to predict a warped target image from a predicted depth map of the monocular depth model, a ray surface of the predicted ray vector, and a projection of the lifted 3D points according to the camera agnostic network.

11. The non-transitory computer-readable medium of claim 10, in which the program code to train comprises program code to self-supervised learning of the monocular depth estimation, the monocular pose estimation, and a unitary ray vector estimation.

12. The non-transitory computer-readable medium of claim 10, in which training comprises self-supervised learning of an ego-motion model to predict rigid transformations between the target image and the one or more context images captured by the camera agnostic network, in which the one or more context images represent adjacent frames of monocular video.

13. The non-transitory computer-readable medium of claim 10, in which the program code to train comprises program code to incorporate intrinsic parameters and extrinsic parameters regarding the plurality of different cameras into a camera agnostic configuration of the monocular depth model and the monocular pose model, and
in which the extrinsic parameters define a location and orientation of the plurality of different cameras with respect to a world frame, and the intrinsic parameters enable a mapping between camera coordinates and pixel coordinates in an image frame.

14. The non-transitory computer-readable medium of claim 10, further comprising estimating a pose transformation from the target image to the one or more context images based on predicted rigid transformations between the target image and the one or more context images captured by the camera agnostic network, in which the one or more context images represent adjacent frames of monocular video.

15. The non-transitory computer-readable medium of claim 10, further comprising:
program code to estimate a trajectory of an ego vehicle based on the warped target image; and
program code to plan a trajectory of the ego vehicle according to an estimated trajectory of the ego vehicle.

16. The non-transitory computer-readable medium of claim 10, further comprising:
program code to scale the predicted ray vector according to a predicted depth; and
program code to offset the predicted ray vector by the camera center.

17. A system for monocular depth/pose estimation in a camera agnostic network, the system comprising:
a depth network to train a monocular depth model and a monocular pose model to learn monocular depth estimation and monocular pose estimation based on a target image and one or more context images from monocular video captured by the camera agnostic network;
a pose network to lift 3D points from image pixels of the target image according to the one or more context images and to project the lifted 3D points onto an image plane according to a predicted ray vector based on the monocular depth model, the monocular pose model, and a camera center according to the camera agnostic network; and
a view synthesis block to predict a warped target image from a predicted depth map of the monocular depth model, a ray surface of the predicted ray vector, and a projection of the lifted 3D points according to the camera agnostic network.

18. The system of claim 17, further comprising an ego perception module to estimate a trajectory of an ego vehicle based on the warped target image.

19. The system of claim 18, further comprising a planner module to plan a trajectory of the ego vehicle according to an estimated trajectory of the ego vehicle.

20. The system of claim 17, in which the monocular depth model and the monocular pose model are configured to incorporate intrinsic parameters and extrinsic parameters regarding the plurality of different cameras into a camera agnostic configuration of the monocular depth model and the monocular pose model, and in which the extrinsic parameters define a location and orientation of the plurality of different cameras with respect to a world frame, and the intrinsic parameters enable a mapping between camera coordinates and pixel coordinates in an image frame.

* * * * *